UNITED STATES PATENT OFFICE.

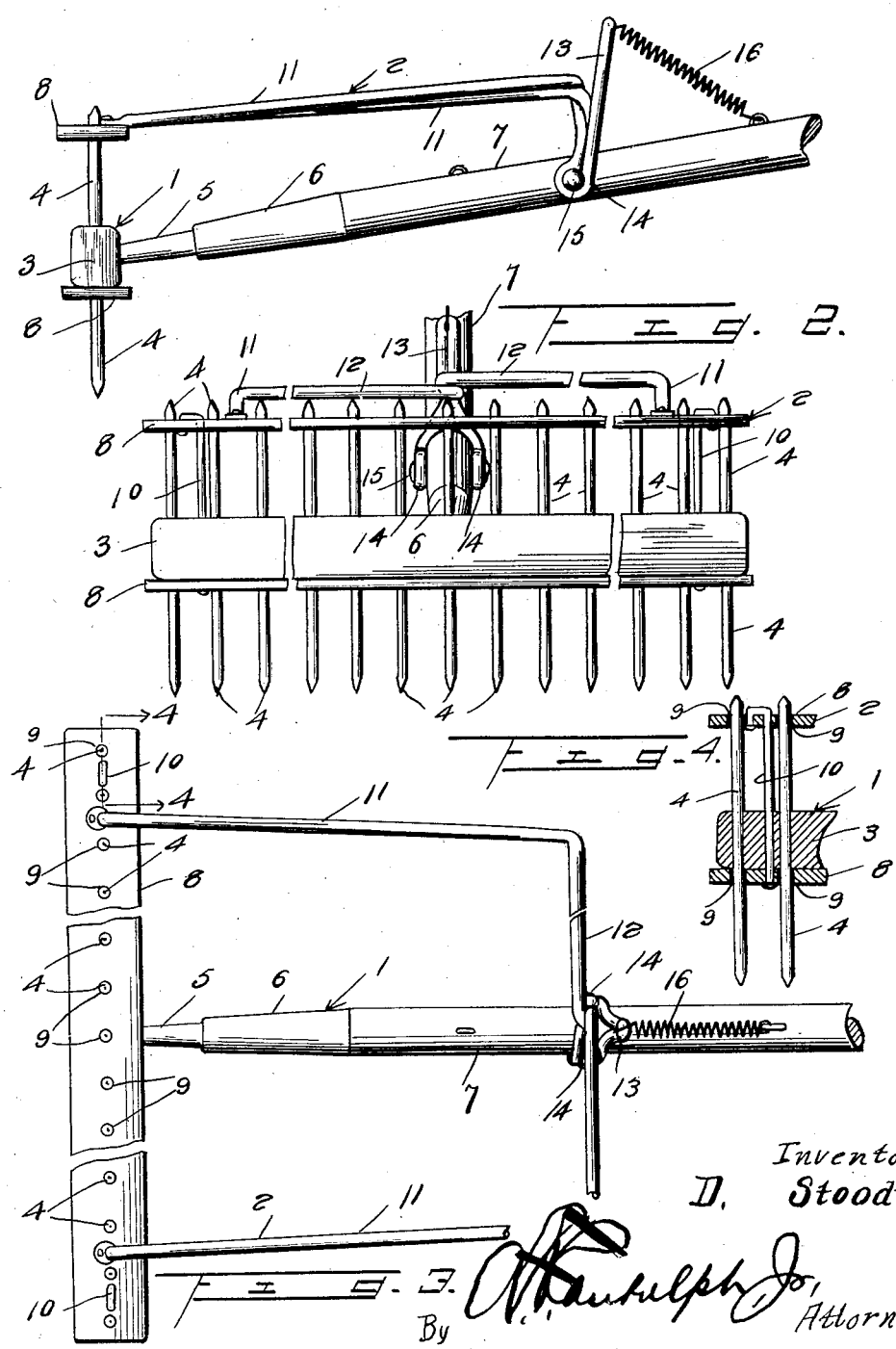

DELVIN STOODT, OF MANSFIELD, OHIO.

RAKE-CLEANING ATTACHMENT.

1,360,813.

Specification of Letters Patent. Patented Nov. 30, 1920.

Application filed July 30, 1919. Serial No. 314,235.

*To all whom it may concern:*

Be it known that I, DELVIN STOODT, a citizen of the United States, residing at Mansfield, in the county of Richland and State of Ohio, have invented certain new and useful Improvements in Rake-Cleaning Attachments; and I do hereby declare the following to be a full, clear, and exact description of the invention, such as will enable others skilled in the art to which it appertains to make and use the same.

This invention relates to cleaning attachments for rakes and the primary object of the invention is to provide an improved means for removing the debris from double headed rakes, which is liable to cling thereon when the rake is being used.

Another object of the invention is to provide a cleaning attachment for double headed rakes embodying a pair of sliding plates associated with the teeth on each side of the rake head, said plates being operatively connected together and to an operating handle mounted upon the rake shank.

A further object of the invention is to provide an improved means for cleaning double headed rakes in which the cleaning plates for the teeth act as a stop and a guide for each other, so as to limit the movement of the plates and thus prevent displacement thereof from the rake teeth.

A still further object of the invention is to provide an improved rake cleaner for double headed rakes which is durable and efficient in use, one that is simple and easy to manufacture, and one that can be placed upon the market at a reasonable cost.

With these and other objects in view, the invention consists in the novel construction, arrangement and formation of parts, as will be hereinafter more specifically described, claimed and illustrated in the accompanying drawings, forming a part thereof, in which:

Figure 1 is a side elevation of the improved rake and attachment,

Fig. 2 is a front elevation of the same,

Fig. 3 is a top plan view of the same, and

Fig. 4 is a detail cross section taken on the line 4—4 of Fig. 3.

Referring to the drawings in detail, wherein similar reference characters designate corresponding parts throughout the several views, the numeral 1 generally indicates the rake and 2 the improved cleaning attachment therefor.

The rake 1 includes the head 3 having teeth 4 projecting in opposite directions from each face thereof, the shank 5 secured by the metal ferrule 6 to the handle 7. A tripping or cleaning plate 8 is mounted on each side of the rake head 3 and the plates are provided with a plurality of slots 9 for slidably receiving the rake 4 and these plates are adapted to be moved toward the outer ends of the teeth so as to effectively remove all debris hanging to the teeth. The cleaning or tripping plates 8 are rigidly connected together, by means of rods 10 which extend from one plate to the other adjacent each end thereof and these rods are slidably received in suitable openings formed in the rake head. The rods form suitable guides for the plates and prevent relative lateral movement of the plates in relation to the teeth of the rake.

The uppermost plate 8 has secured adjacent each end thereof the rearwardly extending arms 11, which are converged toward their rear ends as at 12 and bent upwardly at right angles to provide an operating handle 13 whereby the plates may be conveniently operated. The converged portions 12 of the arms 11 are provided with downwardly extending ears 14, which embrace the handle 7 and are secured thereto by suitable pivot bolts 15. A coil spring 16 has one end thereof secured to the operating lever 13 and the opposite end to the handle 7 and this spring is so tensioned as to normally hold one of the plates 8 in engagement with the head of the rake and the other plate adjacent the terminals of the teeth which are not being used.

Thus, it can be seen that when one of the plates is moved toward the free ends of the rake teeth a distance from one face of the rake head 3, the opposite plate is being brought into engagement with the rake head and limits the outward movement of the plate and prevents displacement thereof from the rake teeth. When it is desired to use the teeth on the opposite side of the rake head, the rake is reversed and spring 16 is released from the handle and hooked to the staple in front of the operating lever 13 which reverses the position of the plates.

It is to be understood that the teeth on the opposite side may be curved if so desired.

From the foregoing description, it can be seen that an improved means is provided for effectively removing debris from a double headed rake, which is simple and convenient to operate.

In practice, I have found that the form of my invention illustrated in the accompanying drawings and referred to in the above description, as the preferred embodiment, is the most efficient and practical; yet realizing that conditions concurrent with the adoption of my device will necessarily vary, I desire to emphasize that various minor changes in details of construction, proportion and arrangement of parts may be resorted to, when required, without sacrificing any of the advantages of my invention as set forth.

What I claim as new is:

1. In a device of the class described, the combination with a rake including a head and outwardly extending teeth carried by each face of the head, a tripping plate carried on each side of the head and having a plurality of slots therein for slidably receiving said teeth, rods rigidly carried by said plates and slidably carried by said head, and an operating lever operatively connected to one of said plates.

2. In a device of the class described, the combination with a rake including a head, teeth projecting outwardly from each face of the head and a handle, of a cleaning device for said teeth including a plate mounted on each side of the head having a plurality of slots therein for receiving said teeth, rods slidably carried by said head having the terminals thereof rigidly secured to the plates, rearwardly extending arms carried by one of the plates, means pivotally securing the arms to the handle, an operating lever carried by said arms in rear of said pivot means, and a spring connected to said handle and operating lever for normally holding the plates between the terminals of the teeth and the rake head, as and for the purpose specified.

In testimony whereof I affix my signature in presence of two witnesses.

DELVIN STOODT.

Witnesses:
JOHN F. KROMER,
W. H. GIFFORD.